Patented Feb. 25, 1930

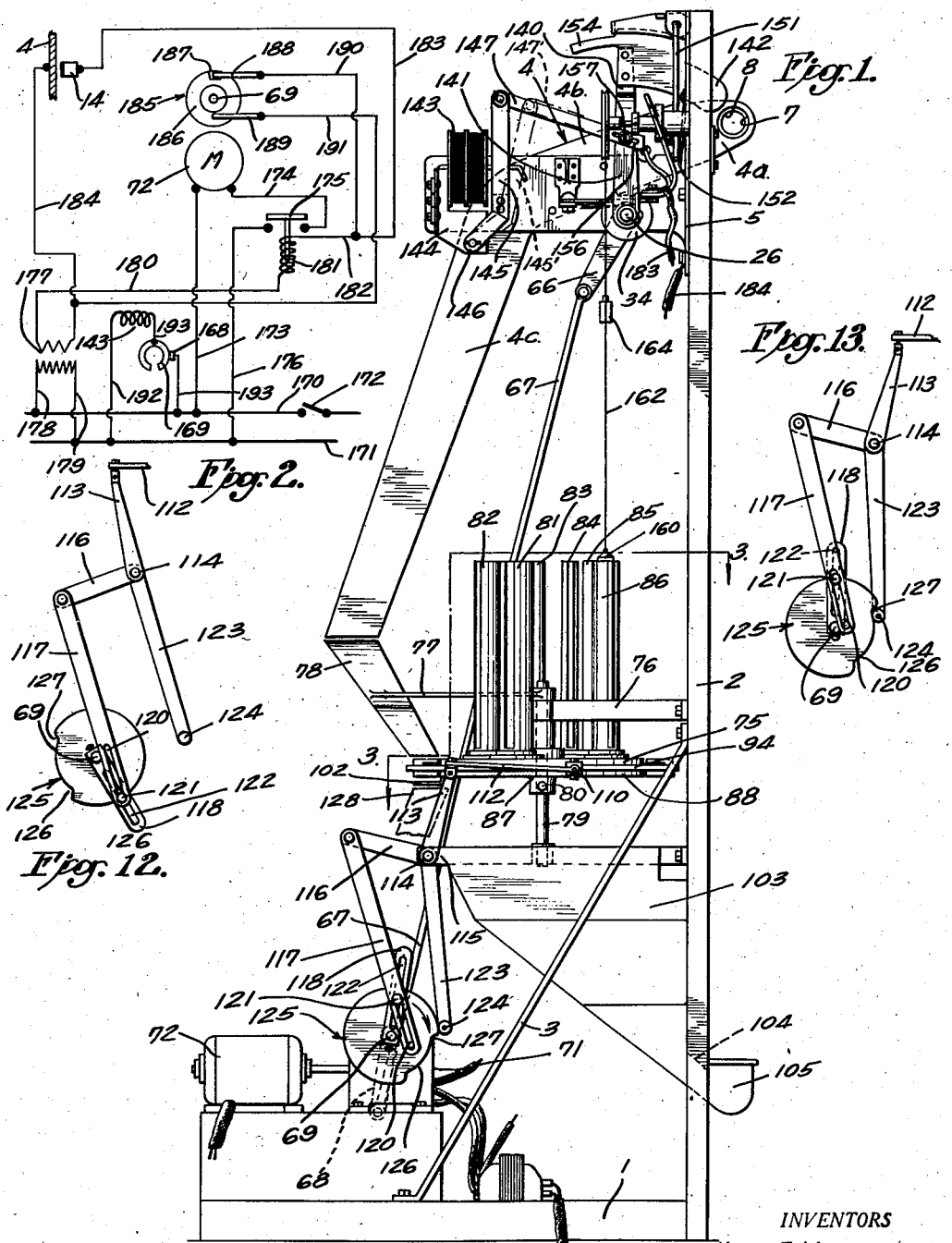

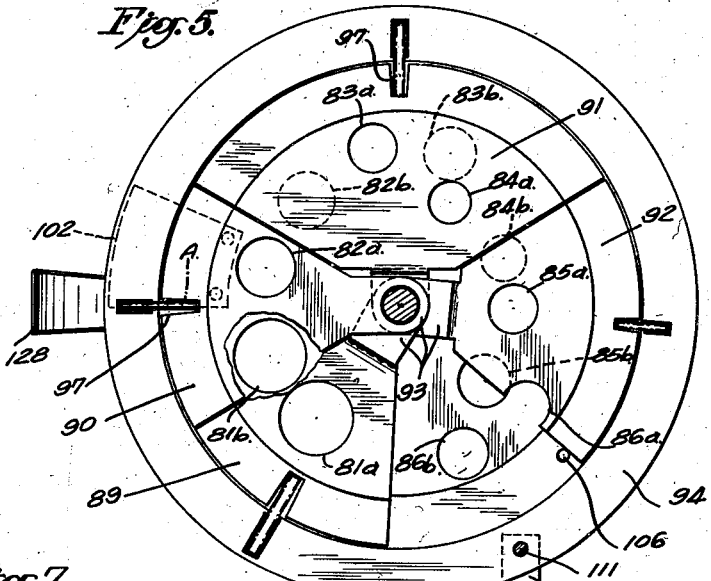
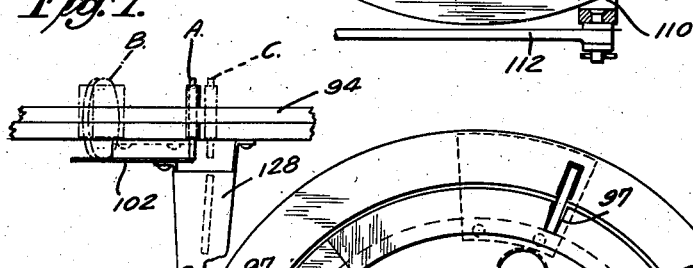
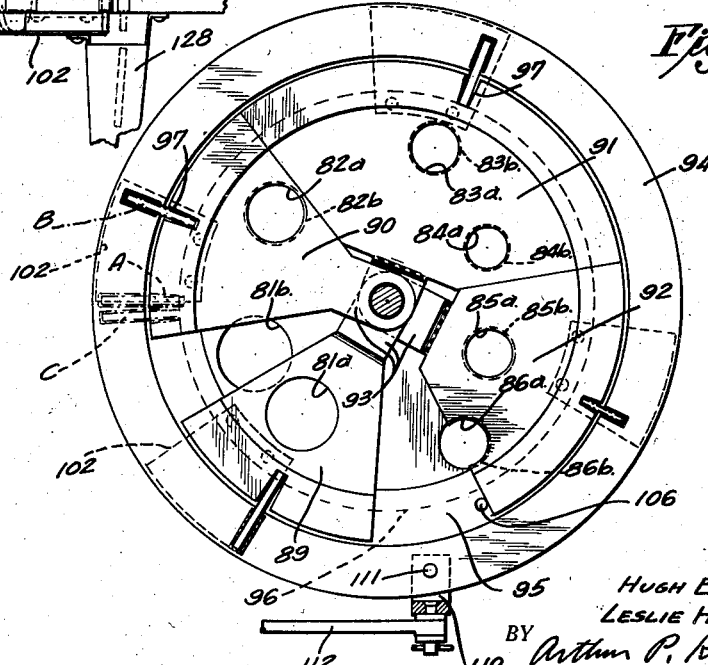

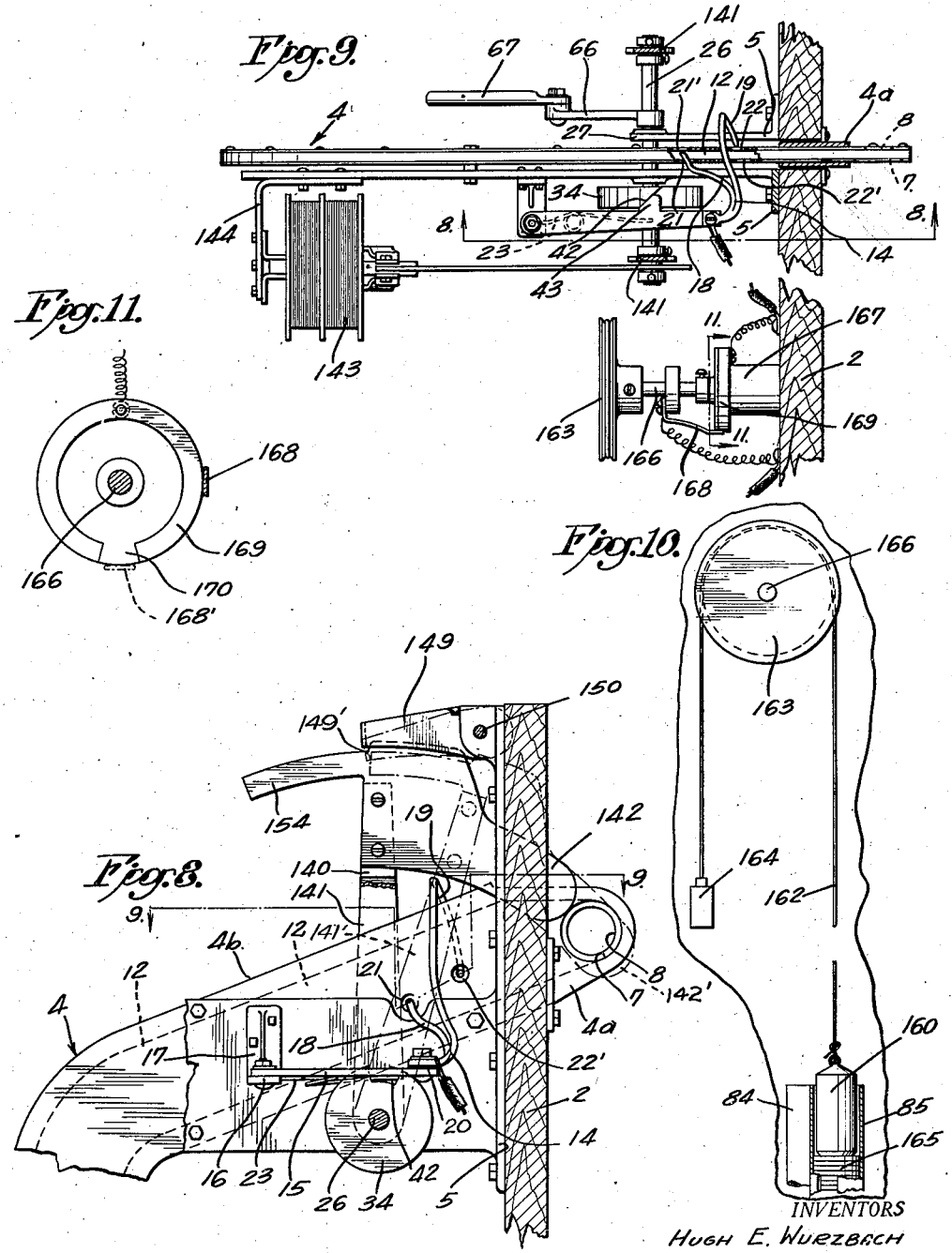

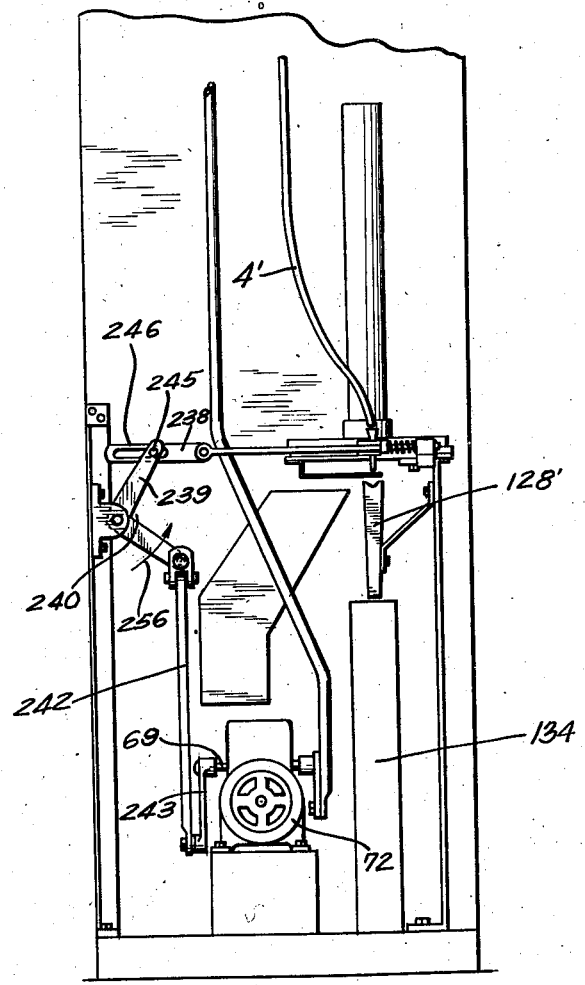

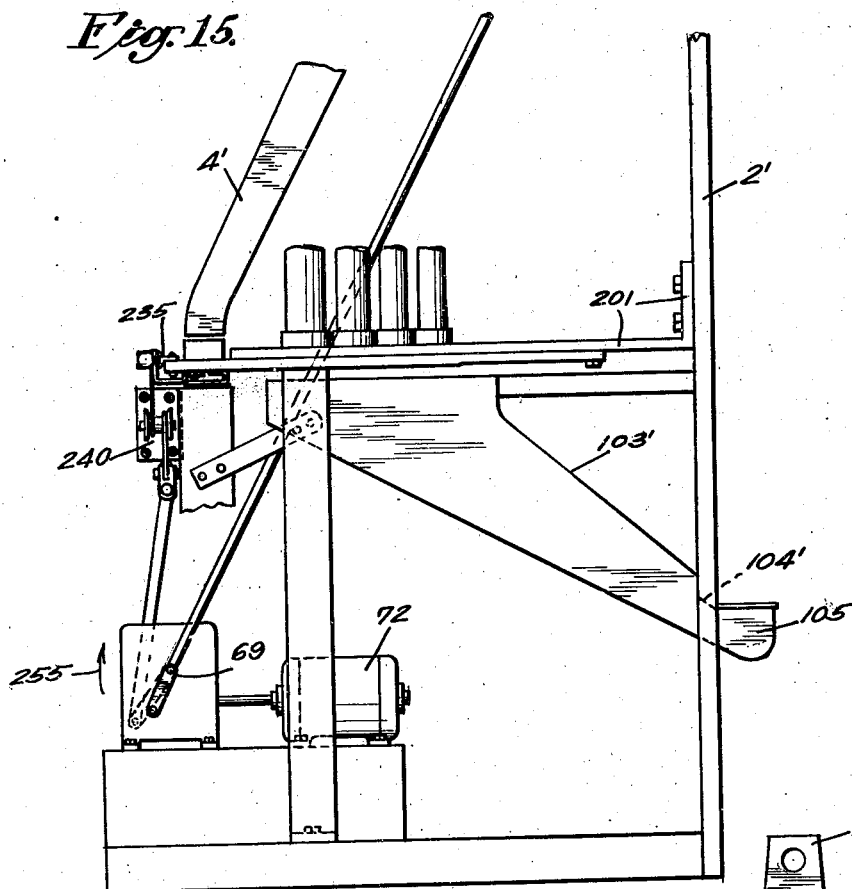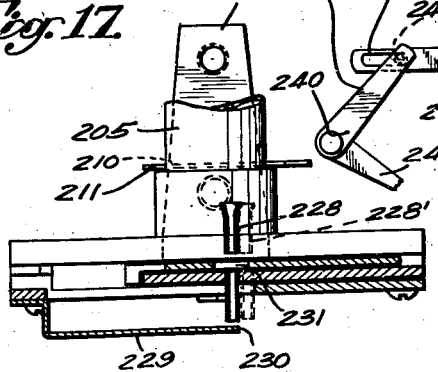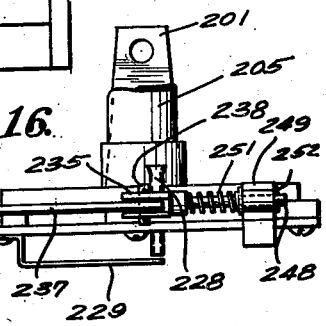

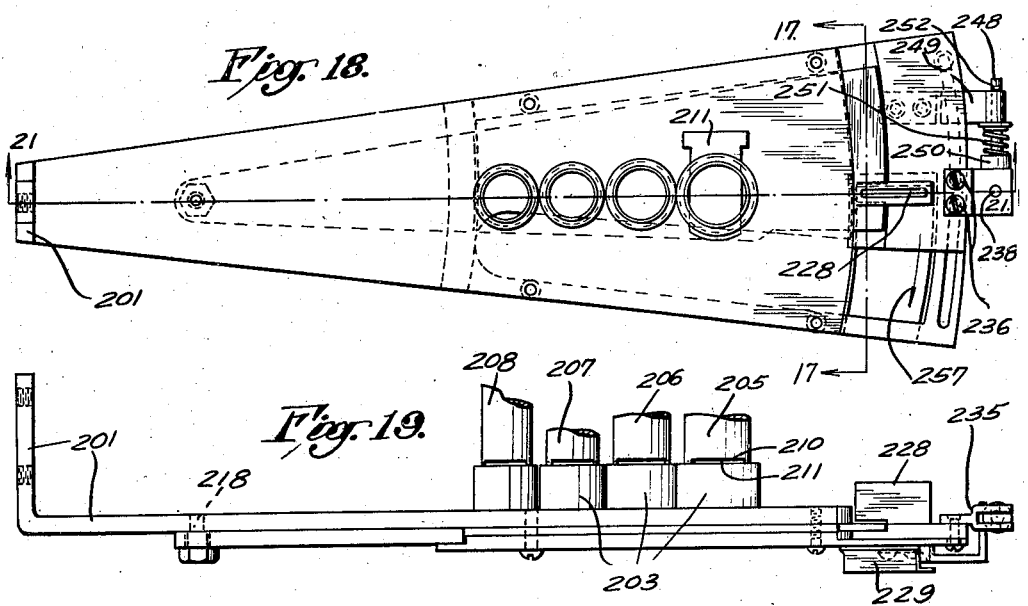
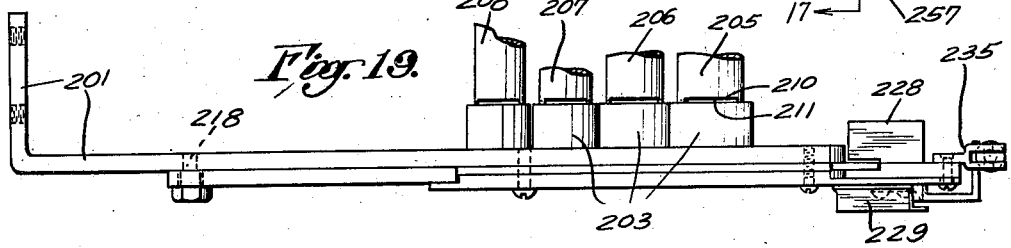
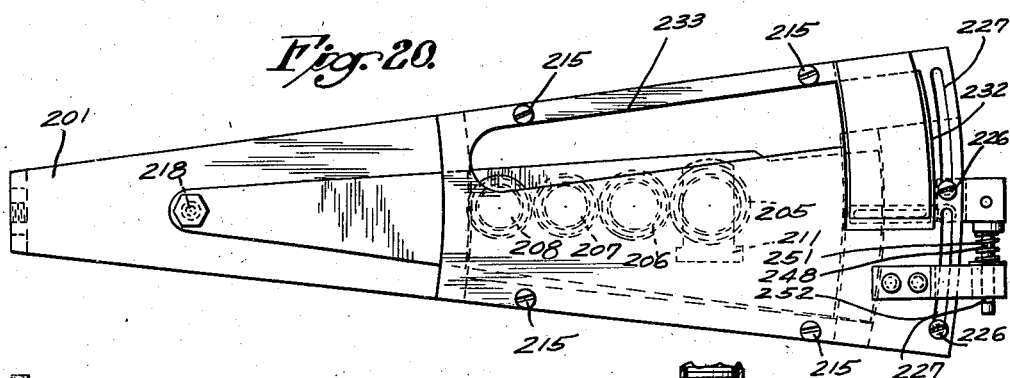
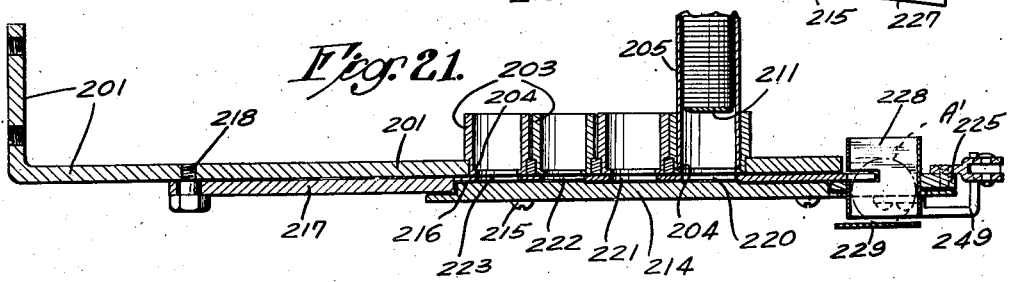

1,748,504

UNITED STATES PATENT OFFICE

HUGH E. WURZBACH AND LESLIE H. WADSWORTH, OF MAGNA, UTAH, ASSIGNORS TO SELECTOR CORPORATION, OF SALT LAKE CITY, UTAH, A CORPORATION OF UTAH

CHECK-CONTROLLED CHANGE-DELIVERING APPARATUS

Application filed February 21, 1928. Serial No. 255,882.

This invention relates to apparatus for delivering change for coins or checks of certain denominations and the principal object of the invention is to provide an apparatus for this purpose which is of simple and rugged construction and is at the same time accurate and absolutely dependable in operation.

A further object of the invention is to provide a change making mechanism having a minimum number of moving parts.

A further object of the invention is to provide a change making mechanism which is operable to deliver change for any one of a plurality of checks of different denominations.

A further object of the invention is to provide a change making mechanism which cannot possibly be operated to deliver more than the correct amount of change for the coin or check deposited therein.

A further object of the invention is to provide a change making apparatus having means for positively preventing insertion of a coin or check therein when the apparatus is incapable of operating properly, whether because of depletion of the supply of change, or failure of the power supply.

The apparatus may be operated by any suitable form of power such as electric motor, spring motor, or hand power, but in the accompanying drawings we have shown the same as being operated by an electric motor. The apparatus as a whole comprises, in addition to the change making mechanism itself, one or more check receiving chutes adapted to deliver the checks received thereby into check holding means in the change making mechanism, an electric motor or other source of power operatively connected to the change making mechanism and means controlled by insertion of a coin or check in any one of said check receiving chutes to start said source of power in operation and cause one complete operation of the change making mechanism.
In the preferred embodiment the source of power comprises an electric motor and the apparatus further comprises closure means operable to position to prevent insertion of the check in the respective check receiving chutes and means operable to cause movement of said closure means to such position when the supply of change or of any unit thereof is exhausted or when the electric power supply for said motor is cut off.

It will be understood, of course, that the respective check receiving chutes may be provided with any suitable check-selecting means for preventing delivery to the several check-holding means of the change-making mechanism of any checks other than those for which the correct change is to be given. Such check-selecting means form no essential part of the present invention, but may, for example, be of the type described in our United States patent application for check controlled apparatus, filed January 25, 1928 under Serial No. 249,438.

The term "check" as used herein is understood to include any coin or other metal disc. While the first form of change-delivering mechanism shown in the drawings and described below is adapted to deliver change for dimes, quarters, half-dollars and dollars of United States money, it is evident that the same may be readily modified so as to deliver correct change for other coins or checks, and while the other form which we have shown and described is particularly adapted to make change for half-dollars alone, it may also be modified in an obvious manner to make change for other coins.

The accompanying drawings illustrate embodiments of our invention and referring thereto:

Fig. 1 is a side elevation of a form of change-delivering mechanism and operating means therefor, for delivering change for any United States silver coin, including dollars, half-dollars, quarters, or dimes, together with check-receiving means for United States half-dollars.

Fig. 2 is a wiring diagram thereof.

Fig. 5 is a horizontal section on line 5—5 in Fig. 4 with the several change-delivering segments in position to receive change from the corresponding change-holding means.

Fig. 6 is a similar view, showing certain of the change-delivering segments in change-delivering position.

Figure 3:
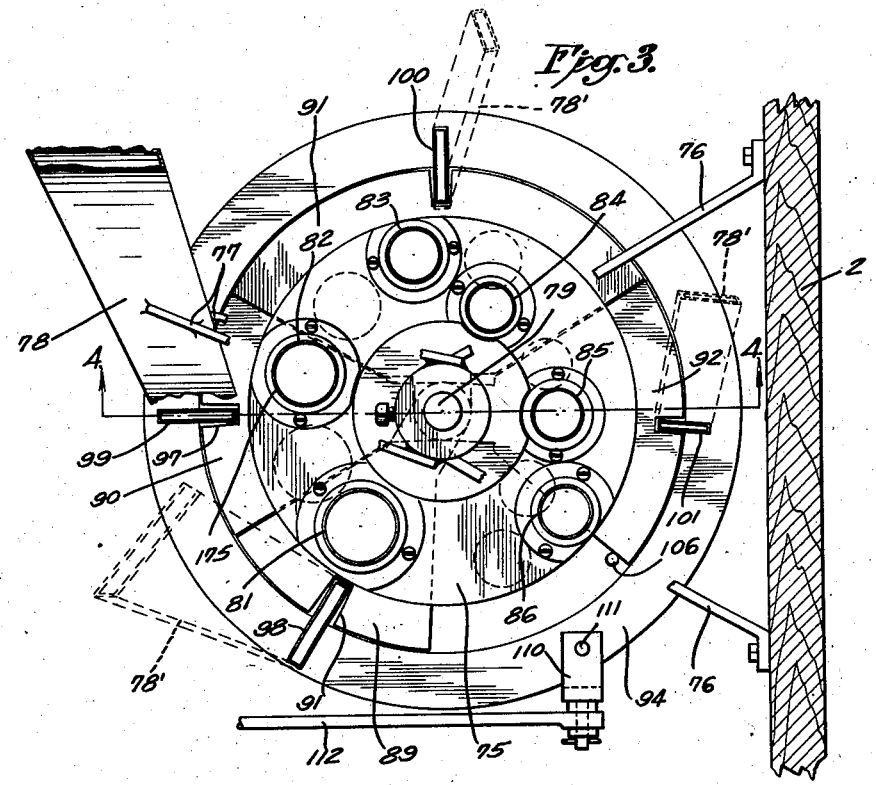
Fig. 3 is a plan view of the change-making mechanism, taken on line 3—3 in Fig. 1.

Fig. 7 is a rear elevation of a portion of the change-making mechanism, showing the different positions of one of the check-holding pockets thereof.

Fig. 8 is a section on line 8—8 in Fig. 9, showing the upper portion of the check-receiving chute and parts associated therewith.

Fig. 9 is a section on line 9—9 in Fig. 8.

Fig. 10 is a rear elevation of a part of the mechanism for causing closure of the check-receiving chute upon depletion of change in the change-making mechanism.

Fig. 11 is a section on line 11—11 in Fig. 9.

Figs. 12 and 13 are side elevations of part of the operating mechanism, in other positions than shown in Fig. 1.

Fig. 14 is a rear elevation of a modified form of change delivering mechanism and operating means therefor, this form of change delivering mechanism being adapted to deliver change for one coin only.

Fig. 15 is a side elevation of the apparatus shown in Fig. 14.

Fig. 16 is an enlarged rear elevation of a portion of such apparatus.

Fig. 17 is a vertical section on line 17—17 in Fig. 18.

Fig. 18 is a plan view of the change delivering mechanism shown in Figs. 14 and 15.

Fig. 19 is a side elevation thereof.

Fig. 20 is an inverted plan view thereof.

Fig. 21 is a vertical section on line 21—21 in Fig. 18.

The apparatus may comprise a base 1 and a front panel board or plate 2 secured to said base in any suitable manner and braced as by means of bars 3. The change-making mechanism shown in Figs. 1 to 7 comprises a supporting base 75 mounted as by means of supporting bracket 76 on the front panel 2. Arms 77 may also be secured to bracket 76 or base 75 and to a guiding chute 78 so as to support the latter. A shaft 79 may be rigidly secured to base 75 and to a lower supporting member 80. Mounted upon base 75 is a plurality of vertical change-holding tubes 81, 82, 83, 84, 85 and 86, which may be adapted to hold coins or checks of any desired sizes or denominations. In the particular apparatus shown, the tube 81 is adapted to hold fifty-cent pieces, the tube 82 quarters, tube 84 dimes, and tubes 83, 85 and 86 nickels, and the mechanism may be operated so as to deliver change for any United States silver coin from a dime to a dollar. A hub portion 87 is secured to shaft 79 as by pin 80, and a bearing ring 88, or other member having a flat upper surface, is secured to said hub portion.

Above said bearing ring, and directly beneath base 75, is provided a plurality of change delivering segments 89, 90, 91 and 92, there being one of said segments corresponding to each coin or check by which the apparatus may be operated, that is in the present instance one each for dollars, half-dollars, quarters and dimes. Said segments are rotatable independently about shaft 79, being provided with inwardly projecting portions 93 engaging said shaft so as to cause the segments to move about said shaft as a center. The upper surface of bearing ring 88 forms a bearing surface for all of said segments. Each of the change delivering segments is provided with a circular recess or recesses which may be moved into position beneath the respective change holding tubes aforesaid or into position above corresponding openings in bearing ring 88. In the machine shown in the drawings, for example, a segment 89 is provided with recess 81$^a$ which in the position shown in Fig. 5 is directly beneath tube 81 but may be moved into position over opening 81$^b$ in ring 88; segment 90 is provided with a recess 82$^a$ movable between a position beneath tube 82 and a position over opening 82$^b$; segment 91 is provided with recesses 83$^a$ and 84$^a$ movable respectively between positions below tubes 83 and 84 and positions above openings 83$^b$ and 84$^b$; and segment 92 is provided with recesses 85$^a$ and 86$^a$ movable respectively between positions beneath tubes 85 and 86 and positions above openings 85$^b$ and 86$^b$. The vertical distance between bearing ring 88 and base 75 is preferably just sufficient to accommodate a coin of the maximum thickness of those to be delivered, while the segments 89 and so on are only as thick as the thinnest coin to be delivered thereby, so that each time one of the recesses therein is moved into position beneath the corresponding change holding tube, one coin will drop from said tube into said recess.

Outside the change delivering segments above described, is provided an operating ring 94 which is provided with an inwardly extending flange 95 bearing upon annular shoulder 96 on the bearing ring 88 aforesaid. Each of the segments above mentioned is provided at its edge with a notch 97, which is of a depth less than the diameter of the coin or check intended to operate such segment, and may, for example, be approximately one-half or less of such diameter. Operating ring 94 is provided with check holding pockets 98, 99, 100 and 101, which are movable into position of alignment with the notches 97 in the respective change delivering segments and are adapted to receive dollars, half-dollars, quarters and dimes respectively. Each of said check holding pockets is open at the top and bottom (see pocket 99 in Fig. 4), and segmental flanges 102 may be secured to ring 88 so as to support the checks or coins in the respective pockets. A pin 106 may be projected upwardly from the flange 95 of operating ring 94 to engage the segment 92 upon counter-clockwise rotation of said ring as hereinafter described.

A hopper 103 is mounted upon panel 2 in position to receive change passing through the openings 81$^b$ to 86$^b$ in ring 88, upon operation of the machine as hereinafter described, said hopper being adapted to deliver such coins through opening 104 into the change delivering cup 105 in front of panel 2.

While we have shown the complete check receiving means and the contact mechanism and other parts associated therewith, for fifty-cent pieces only, this form of change making apparatus is adapted as above mentioned to make change for dollars, quarters and dimes as well, it being understood that such other coins may be delivered through similar check-receiving chutes and through guiding chutes as shown in dotted lines at 78' in Fig. 3, to the other check holding pockets 98, 100 and 101. A chute 128 is secured to ring 88 just beyond one end of flange 102 beneath pocket 99 so as to receive the coin discharged from said pocket upon movement thereof beyond the end of the flange 102 as hereinafter described, and it will be understood that similar discharge chutes may also be provided for conducting away the released coins from the other check holding pockets. Chute 128 may open at its lower end into any suitable receptacle for the coins discharged therethrough, and suitable receptacles may also be provided for the coins discharged from the other pockets; or all of said chutes may lead to a common receptacle.

The operating mechanism for the change making apparatus may comprise a flexible clevis 110 mounted on operating ring 94 by means of bolt or pin 111, and connecting rod 112 connecting said clevis to lever arm 113 on shaft 114. Said shaft may be rotatably mounted in bearings 115 at the rear end of hopper 103 and may be provided adjacent its other end with a lever arm 116 connected by link 117 to arm 118 on shaft 69. In order to permit limited freedom of movement between arm 118 and link 117, said link may be provided with a slot 120 engaging pin 121 which may be adjustably secured in slot 122 on said lever arm. An arm 123 is also secured to shaft 114 and is provided at its lower end with a roller 124 adapted to engage a cam member 125 on shaft 69, said cam member being provided with a notch 126 extending throughout a portion of its periphery and having a shoulder 127 adapted to engage said roller as hereinafter described.

Shaft 69 may be operatively connected through suitable reducing gear mechanism in housing 71 to an electric motor 72. Suitable limit switch mechanism may also be provided in housing 71, as hereinafter described, for causing motor 72 to rotate shaft 69 through one complete revolution each time the circuit is completed by insertion of a check in the apparatus.

Suitable means are provided for receiving the respective checks or coins for which change is to be made and delivering the same to their proper positions in the change making mechanism, but in Fig. 1 we have illustrated only the check receiving chute and mechanism associated therewith for delivering a fifty-cent coin to the check holding pocket 99 of the above described change making mechanism. This check receiving chute 4 may be secured to panel 2 as by means of brackets 5 and may comprise a portion 4$^a$ projecting in front of panel 2, a portion 4$^b$ having a slight downward and rearward inclination, and a portion 4$^c$ having a somewhat greater downward inclination. Said chute is provided with a passage 12 extending through all of said portions thereof, the portion 4$^a$ being provided with an opening 7 through which the check may be inserted into said passage and the portion 4$^c$ terminating directly above or being connected to the upper end of the above mentioned guiding chute 78 of the change making mechanism.

The opening 7 is preferably of just sufficient diameter to permit a check of the desired size, that is, in this case, a fifty-cent piece, to be inserted therethrough. An opening 8 may also be provided in the other side wall of chute 4, of somewhat less diameter than the opening 7. The guiding chute 78 opens at its lower end directly above the position occupied by check holding pocket 99 when the recess 82$^a$ of the corresponding change delivering segment is directly below change holding tube 82, that is, when the parts are in the position shown in Figs. 3 and 5.

Referring particularly to Figs. 8 and 9, a contact member 14 is mounted upon the end of arm 15 which is pivotally mounted as at 16 on bracket 17 secured to one side of chute 4 or to one of the brackets 5. Suitable insulating means 20 is provided between contact member 14 and arm 15. Contact member 14 is provided with two contact arms 18 and 19 projecting through openings 21 and 22 in the respective side walls of chute 4, and a spring 23 is provided which presses inwardly on arm 15 so as to normally hold the end of contact arm 18 in position to obstruct passage 12, and arm 19 just clear of said passage, as shown in Fig. 9. Openings 21' and 22' are provided opposite the openings 21 and 22 respectively, so as to permit arms 18 and 19 to be moved entirely across the passage 12 and into or through openings 21' and 22' without making contact with the walls of chute 4.

A shaft 26 may be rotatably mounted in bearing means 27 or brackets 5. A cam member 34 may be secured to shaft 26 in any suitable manner, and provided with an inclined cam face 42 operable to engage lug 43 on arm 15 and move said arm outwardly as hereinafter described. Shaft 26 may be connected by arm 66, link 67 and arm 68 to the motor driven shaft 69 aforesaid.

In order to prevent insertion of a coin or check in the apparatus when the device is inoperative, suitable closure means for the openings 7 and 8 in chute 4 may be provided. Such means may comprise, for example, a yoke 140 having arms 141 loosely mounted on shaft 26. Closure members 142 may be mounted upon the yoke 140 at the respective sides of chute 4. Said closure members are normally held in raised position so as to leave the openings 7 and 8 unobstructed, by means of the solenoid or electromagnet 143, mounted upon bracket 144, the armature 145 of said solenoid being pivotally mounted at 146 and being connected by link 147 to one of the arms 141 aforesaid. As long as solenoid 143 is energized the parts are held in the positions shown, but upon de-energization of such solenoid the members 145, 147, 141 and 142 are moved by gravity to the positions indicated in dotted lines at 145′, 147′, 141′ and 142′ in Figs. 1 and 8 so as to close the openings 7 and 8 and prevent insertion of a coin or check therethrough. In order to prevent raising of the closure members 142, except when the solenoid 143 is energized, a catch member 149 may be pivoted as at 150 and provided with an arm 151. A small leaf spring 152 engages the lower end of said arm and tends to hold catch member 149 in raised position as shown. Upon deenergization of solenoid 143, however, the forward end of link 147 engages the lower end of arm 151 and depresses said arm and the catch member 149 to the position shown in dotted lines at 149′ (Fig. 8) so as to cause said catch member to engage a projection 154 on one of the closure members 142 and prevent the same from being raised. It may be seen, however, that when the solenoid is again energized the link 147 will be drawn away from arm 151 and permit spring 152 to restore catch member 149 to normal position. Link 147 may be slotted as shown at 156 so as to permit said link to move sufficiently to thus release the catch member, in spite of the fact that the closure members and arms 141 are held from movement. After the catch member has been released the forward end of said slot engages pin 157 on arm 141 to raise the same to the position shown.

Suitable means may also be provided for causing deenergization of solenoid 143 upon depletion of change in the change making mechanism. Such means may comprise a weight 160 hung from a cord or other flexible member 162, running over pulley 163 and provided at its other end with a smaller tensioning weight 164. The weight 160 rests upon the stack of coins in one of the change holding tubes, and preferably in one of such tubes which is most frequently required to deliver change; for example, said weight may rest upon the stack of nickels indicated at 165 in tube 85 (see Fig. 10). Pulley 163 may be secured to shaft 166 which is rotatably mounted in bearing means 167 and is provided with a spring contact member 168. Said contact member is adapted to engage a fixed contact segment 169 as long as weight 160 remains above a certain position, said segment being cut away, however, as at 170, so that when contact member 168 reaches the position shown in dotted lines at 168′ in Fig. 11, due to depletion or approximate depletion of coins from tube 86 and consequent lowering of weight 160, connection with contact segment 169 will be broken.

The electric circuit for the apparatus may comprise, as shown in Fig. 2, supply wires 170 and 171 connected to any suitable source of electric power supply, for example, a commercial 110 volt supply line. A switch 172 may be provided in one of said wires for turning on or off the supply of power to the apparatus. Wire 173 may lead from wire 171 to the electric motor 72, the other side of said motor being connected by wire 174 to a circuit closing relay switch 175, whence wire 176 leads to the other supply wire 170. A step-down transformer, such as an ordinary bell ringing transformer 177, may be connected by wires 178 and 179 to the power supply wires 170 and 171, the secondary of said transformer being connected by wire 180 to the winding 181 of relay switch 175 aforesaid. The other side of winding 181 may be connected by wires 182 and 183 to the contact member 14. Wire 184 may lead from the other side of the secondary winding of transformer 177 to any suitable part of the apparatus which is electrically connected to chute 4, for example to one of the brackets 5 supporting said chute as shown in Fig. 1, said wire being shown in Fig. 2 as connected directly to chute 4.

A limit switch 185 of any suitable type may be provided on shaft 69, said limit switch comprising, for example, as shown diagrammatically in Fig. 2, a contact ring 186 secured to said shaft and insulated therefrom and provided with a cut-out portion or insulated segment 187, said insulated segment extending only partially across said contact member. A brush 188 may be mounted in position to engage said insulated segment and the outer portion of ring 186, while brush 189 may be mounted in such position as not to engage said insulated segment, but to continually engage ring 186, upon rotation of said ring. The brush 188 may be connected by wire 190 to wire 182 leading to relay winding 181, while brush 189 may be connected by wire 191 to the secondary winding of transformer 177.

One terminal of solenoid 143 may be connected by wire 192 to supply wire 171 and the other terminal by wire 193 to contact segment 169, while the contact member 168 may be connected by wire 193 to supply wire 170.

It will be understood, of course, that the entire device may be enclosed in any suitable housing or casing, of which the panel 2 may comprise the front wall, so that only the upper end of the check receiving chute 4 and the change delivering cup 105 are open to access by any one desiring to use the machine.

The operation of the above apparatus is as follows: The several change holding tubes are first provided with a supply of the respective coins to be delivered thereby, tube 81 being in the present instance filled with half dollars, the tube 82 with quarters, tube 84 with dimes, and tubes 83, 85 and 86 with nickels. The stack of nickels in tube 85 is indicated at 165 in Figs. 4 and 10. The coins may be inserted in these tubes in any suitable manner, said tubes being advantageously provided with longitudinal slots 175 to facilitate insertion of the coins therein and to also permit the stack of coins in each tube to be seen from the side so that one may readily tell at a glance the supply of coins in the respective tubes.

The apparatus being then placed in operative condition by completing the electric circuit as by closing switch 172, solenoid 143 is energized and operates through armature 145, and link 147 to release catch member 149 and raise the closure means 142 to the position shown in full lines in Fig. 8, thus exposing the opening 7 for insertion of a check. It will be understood that the circuit of solenoid 143 is at this time completed because the stack of nickels in tube 85 is of sufficient height to cause contact member 168 to be held in a position of engagement with contact segment 169.

Any coin or check whose diameter is not greater than that of the opening 7 may then be inserted through said opening into the upper end of passage 12, and, if such check is not of greater thickness than the distance between the walls of chute 4, it will then be permitted to roll down in the passage 12, but, if said check is too thick, it will be held in position opposite the opening 7 and may be removed by inserting the finger through opening 8. Any metal check which rolls down in passage 12 will be arrested by contact arm 18 but will at the same time complete an electric circuit as follows: from the secondary winding of transformer 177, through wire 184 to the wall of chute 4, through the metal check to contact member 14, and thence through wires 183 and 182, solenoid 181 and wire 180 back to the transformer. Switch 175 is thus closed due to energization of solenoid 181 and the circuit of motor 72 is completed through wire 176, switch 175 and wires 174 and 173. Motor 72 being thus set in operation, shaft 69 is rotated at a suitable speed and contact ring 186 is rotated sufficiently to make contact with brush 188 before the circuit through the metal check is broken, so that an additional circuit is thus established for solenoid 181, through wire 190, brush 188, contact member 186, brush 189, and wire 191. The motor circuit will, therefore, be kept closed regardless of the passage of the check out of contact with arm 18, until the limit switch 185 has made one complete revolution as hereinafter described.

Rotation of shaft 69 in the direction indicated by the arrow in Fig. 1 then operates through arm 68, link 67 and arm 66 to rotate shaft 26 and cam member 34 thereon so as to cause the inclined face 42 to engage lug 43 and move arm 15 outwardly against spring 23, thus withdrawing arm 18 from passage 12 and permitting the charge to proceed further in said passage. It should be noted at this point, however, that since arms 18 and 19 move together, the latter arm enters passage 12 as the former is withdrawn therefrom. By this means, if a second check is inserted in chute 4 before the first check has been released by arm 18, or during the time of operation of the apparatus by the first check and while arm 18 is still withdrawn from passage 12, this second check will be arrested by arm 19 until said arm is withdrawn as hereinafter described.

Upon being released by arm 18 the check will pass downwardly through the inclined portions 4$^b$, 4$^c$ of chute 41 and thence through guiding chute 78 into the check holding pocket 99 which is at this time in the position shown in Figs. 3 and 5. The check in this position is indicated at A in Figs. 4, 5, 6 and 7 and it may be noted that the coin is held in said pocket by supporting segment 102 and that said coin also projects within the notch 97 of segment 90 and, therefore, serves to key said segment to the operating ring 94. Further operation of the motor driven shaft 69 will then operate through arm 118, link 117, arm 116, shaft 114, arm 113 and rod 112 to rotate operating ring 94 in a clockwise direction in Figs. 3 and 5 until the parts are brought to the position shown in Fig. 6. The check is thus moved to the position indicated at B in Figs. 6 and 7 and due to engagement of said check in notch 97 the segment 90 is caused to rotate with the operating ring. Segment 90 also pushes the segments 91 and 92 ahead of it in such rotation, so that at the end of this rotation the segments 90, 91 and 92 are in the positions shown in Fig. 6 while the segment 89 remains in its original position as shown. It will be noted that the recesses 82$^a$, 83$^a$, 84$^a$, 85$^a$ and 86$^a$ are thus brought into position over the corresponding openings 82$^b$, 83$^b$, 84$^b$, 85$^b$ and 86$^b$ and the coins contained in the respective recesses are, therefore, permitted to fall through said openings into hopper 103 and thence through opening 104 into the change delivering cup 105 from which they may be taken by the person operating the machine.

It will be seen, therefore, that insertion of a fifty-cent piece through the check receiving chute into its proper position in the change delivering mechanism will cause to be delivered a quarter, a dime, and three nickels. In similar manner insertion of a silver dollar in pocket 98 will cause delivery of the same amount of change, together with a fifty-cent piece delivered by segment 89 which will also be rotated in that case. It is also evident that insertion of a quarter into the pocket 100 will cause to be delivered a dime and three nickels by rotation of segments 91 and 92, while insertion of a dime in pocket 101 will cause rotation of segment 92 alone and thus deliver two nickels. The check inserted in the apparatus, therefore, not only acts to complete an electric circuit which starts the apparatus in operation, but also serves as a key member to cause operation of only the necessary change delivering elements to deliver the correct amount of change for said check.

The position of cam member 125, arm 118 and the parts operatively connecting said arm to the change delivering mechanism, at the completion of the above described change delivering operation, is shown in Fig. 12, as is also the position occupied by arm 123 at this time. Further operation of shaft 69 in the same direction operates through arm 118, link 117 and arms 116 and 114 to rotate the operating ring 94 in a reverse direction, that is in a counterclockwise direction in Figs. 5 and 6, sufficiently to move the coin in pocket 99 and notch 97 back to the position indicated in dotted lines at C in Figs. 6 and 7. It will be seen that said check is thus moved beyond the end of segment 102, so that such check will be released and fall through chute 128 into the receptacle above mentioned for checks discharged through said chute.

Figure 4:
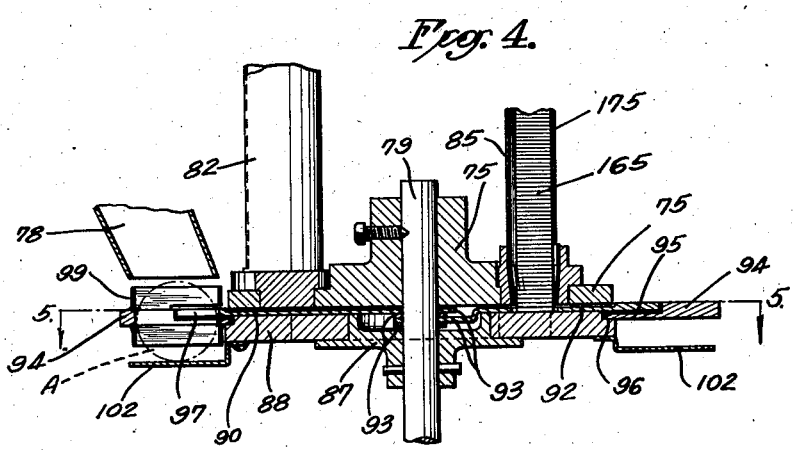
Fig. 4 is a section on line 4—4 in Fig. 3.

At the completion of this check discharging operation, cam member 125, arm 118, link 117, etc. are in the positions shown in Fig. 13 and it will be noted that arm 123 has by this time been moved into position within the notch 126 on cam member 125. A slight further rotation of shaft 69 to the position shown in Fig. 1 causes shoulder 127 on cam member 125 to engage roller 124 and move arm 123 to the position shown in Fig. 1, thus causing a slight clockwise rotation of operating ring 94 so as to bring the pocket 99 back to its initial position as indicated in Figs. 4 and 5, just above the edge of segment 102, so that the next coin delivered through chute 78 into said pocket will be held therein as before. It should be pointed out that the actual distance through which pocket 99 is moved in this last operation is very small, such distance being somewhat exaggerated in Figs. 6 and 7 for the purpose of illustration.

It is only necessary that the check in the position C be just clear of the edge of segment 102 and that in the position A the coin shall rest upon said segment sufficiently to hold it in position in pocket 99. The notches 97 of the several change delivering segments are of sufficient width so that this slight movement of the check receiving pockets, such as 99, will not move such pockets out of alignment with the respective notches.

It will be understood that in the above described counter-clockwise rotation of operating ring 94 to move the check from the position indicated at B to that indicated at C, pin 106 will engage segment 92 and push said segment together with segments 91 and 90 back to their initial positions as shown in Figs. 3 and 5, whereupon another coin will be delivered from the several change holding tubes into the recesses 82$^a$ to 86$^a$ inclusive. The change delivering mechanism is thus completely restored to its original position and is, therefore, ready for subsequent operation.

Following the restoration of the check holding pocket 99 to check receiving position as above described, limit switch 185 operates to bring insulating segment 187 into position beneath brush 188 so as to break the circuit of solenoid 181 and open relay switch 175, thus stopping motor 72. During the latter part of rotation of shaft 69, however, and before stopping of the motor as above described, arm 68, link 67 and arm 66 operate to rotate shaft 26 in the reverse direction to that above described, thus causing inclined cam face 42 to be moved out of engagement with lug 43 and permit spring 23 to return the contact arm 118 to its initial position and simultaneously withdraw arm 19 from passage 12. Any check which had previously been held back by arm 19 is thus permitted to roll down against arm 18 so that the apparatus will in that case be immediately started upon a second operation as soon as the first is completed. It is evident, therefore, that contact arms 18 and 19 permit the insertion of any number of checks which may be held in passage 12 above said arms, without waiting for completion of the operation caused by the first of said checks, and any additional checks so deposited will be held by arm 19 until the first operation is completed and will then cause successive operations of the machine until all of said checks have been handled.

In the event of failure of the power supply through lines 170 and 171, solenoid 143 will be de-energized and cause the closure members 142 to be moved to position to obstruct openings 7 and 8 as above described. Furthermore, depletion of the coins in tube 85 below a certain predetermined level will operate as above described to break connection between contact member 168 and segment 169, thus breaking the circuit of solenoid and causing similar operation of closure members 142 in this case also. It is, therefore, evident that means are provided for positively preventing insertion of any check in the apparatus when the same is inoperatively, either by reason of failure of the power supply or because of depletion of the supply of change therein.

The form of change delivering mechanism shown in Figs. 14 to 21 inclusive is a simplified form adapted only for the delivery of change for one particular coin or check, the particular apparatus shown being adapted to deliver change for a half dollar. The change delivering mechanism in this case comprises a supporting bracket 201 which may be secured to the front panel 2' as shown in Fig. 15. A particular feature which we have shown in connection with this form of the invention is the provision for using removable coin tubes or magazines for holding the stacks of coins to be delivered, it being understood of course that this same form of removable coin holding tube may also be used in connection with the form of the invention above described instead of the stationary coin holding tubes shown in that form of the invention. The supporting bracket 201 is shown as provided with a plurality of tubular magazine receptacles 203 each provided with a shoulder 204, there being one of said receptacles for each coin to be delivered by the mechanism. A portable coin holding tube or magazine is provided for each stack of coins, there being in this case a magazine 205 for twenty-five-cent pieces, a magazine 206 for five-cent pieces, and two magazines 207 and 208 for ten-cent pieces, said magazines being adapted to fit within the respective receptacles 203 and rest against the shoulders 204 therein.

In order to hold the coins in the respective magazines when inserting or removing the same from the receptacles, each magazine may be provided with slots 210 adapted to receive a sliding gate 211 to hold the coins in the tube above this point as shown in Fig. 21. After the magazine is inserted in position in the receptacle the sliding gate 211 may be removed, thus allowing the coins to fall to the bottom of the magazine in position to be delivered as hereinafter described.

The mechanism further comprises a bearing plate 214 secured beneath supporting bracket 201 as by means of screws 215 and having a shallow recess in the central portion of its upper surface. A change delivering segment 217 is pivotally mounted upon bracket 201, as by means of pin 218, to swing in a horizontal plane, the outer portion of said segment moving within the recess 216 above mentioned and being of just sufficient thickness beneath the respective coin holding magazines to receive one coin therefrom each time said segment is moved into position to bring the openings 220, 221, 222, and 223 therein into position beneath the respective magazines 205 to 208.

An operating member 225 is slidably mounted adjacent the outer edge of bearing plate 214 and is guided in an arc shaped path about the pin 218 as a center by means of screws 226 secured to said operating member and travelling in arc shaped slots 227 in said bearing member. Upon said operating member is mounted a check holding pocket 228 of such size and shape as to hold a check of the size for which change is to be delivered. A check supporting plate 229 is secured to bearing member 214 and extends beneath the check holding pocket 228 in position to support the check in said pocket during the greater portion of the movement thereof, while permitting motion of the check holding pocket beyond the edge 230 of said plate, for discharge of the check therefrom as hereinafter described. The change delivering segment 217 is provided at its outer edge with a notch 231 extending part way across the width of pocket 228 so that a check held in said pocket also engages in said notch. The bearing plate 214 is provided with an opening indicated at 232 in which the portion of the check receiving pocket below the operating member 225 moves upon movement of said operating member. Opening means, such as opening 233 is also provided in bearing plate 214, in such position that a certain rotative movement of segment 217 about pin 218 will bring the several coin holding openings of the change-delivering segment into position above said opening.

A hopper 103' is provided, in position to receive coins falling through opening 233, said hopper being adapted to deliver such coins through opening 104' into the change delivering cup 105' in front of panel 2, and a chute 128' is provided as before for receiving the operating check discharged from the pocket 228 and delivering the same, for example, to receptacle 134.

The operating means for the change delivering mechanism comprises a clevis 235 secured to operating member 225 as by means of screws 236, a rod 237 being connected to said clevis as by means of pin 238, and link 238' connecting rod 237 to an arm 239 of bell crank 240. The other arm 241 of said bell crank is connected by rod 242 to arm 243 on shaft 69, which may be driven by motor 72 in the same manner as in the form first described. Bell crank arm 239 is provided with a pin 245 slidably engaging in slot 246 in link 238 so as to permit movement of said bell crank through a certain range without causing movement of said link.

Yielding stop means are provided, for the operating member 225, said stop means comprising for example a pin 248 slidably mounted in bracket 249 secured to the underside of the bearing member 214 and provided at its outer end with a head or stop member 250 which is resiliently held in the position shown in Fig. 18 by means of compression spring 251. Movement of the stop member 250 in a direction toward the clevis 235 is limited by means of a small retaining pin 252 engaging against the other end of bracket 249.

The operating coin or check may be delivered to pocket 228 through chute 4' which may be substantially the same as the chute 4 above described. The electric circuit for motor 72 may be substantially the same as in the first form of the invention, suitable contact means being provided as before in chute 4' so as to set the motor in operation upon insertion of a coin or metal check in said chute and suitable limit switch means being provided as before for causing the motor to operate the mechanism through one complete cycle each time its circuit is thus completed. It will be also understood that the same means as before may be provided for preventing insertion of a check in the chute 4' in the event of failure of the electric power supply or in the event of depletion of the coins from the coin holding magazines 205 to 208, the weight 160 shown in Fig. 10 being permitted to rest upon the stack of coins in any one of said coin holding magazines.

The operation of the mechanism just described is as follows:

Assuming that the parts are normally in the position shown, that is, with the check holding pocket 228 in position beneath the chute 4', insertion of a check in said chute will as before close the electric circuit and start the motor 72 in operation, causing shaft 69 to rotate in a clockwise direction as indicated by the arrow 255 in Fig. 15. Arm 243 and rod 242 will cause bell crank 240 to rotate in a counter-clockwise direction as indicated by the arrow 256 in Fig. 14, the pin 245 on arm 239 of said bell crank moving in slot 246 throughout the first portion of such movement to allow time for the check, after release from the contact means in chute 4' as above described, to pass through said chute and be deposited in the check holding pocket 228 as indicated at A' in Fig. 21. After the check has been so deposited, pin 245 engages the outer end of slot 246 and operates through arms 238 and 237 to move the operating member 225 in a clockwise direction as indicated by the arrow 257 in Fig. 18. If a check is at this time in position in the pocket 228, the engagement of said check in notch 231 will cause the change delivering segment 217 to move with operating member 225 sufficiently to bring the openings 220 to 223 in said segment into position over the opening 233 and permit the coins to drop from said openings in the change delivering segment through the opening 233 and hence through hopper 103' to the change delivering cup 105'. Upon further rotation of shaft 69, arm 243 will pass dead center position with respect to link 242 and will then cause the bell crank 240 to be rotated in the reverse direction until pin 245 engages the other end of slot 246 whereupon arms 238 and 237 will operate to move operating member 225 and segment 217 in a reverse direction sufficiently to bring the check holding pocket 228 to a position beyond the edge 230 of plate 229 as indicated in dotted lines at 228' in Fig. 17, at which time the operating check is dropped through the discharge chute 128'. In the latter part of this movement clevis 235 engages the yielding stop member 250 and compresses spring 251, so that when the bell crank reaches the limit of its movement in this direction and returns to normal position, thus moving pin 245 away from the end of slot 246, said spring and stop member will operate against said clevis to return the parts to the assumed normal position. The cycle is then completed and the motor stopped by operation of the limit switch means.

In both of the forms of the invention above described it has been assumed that the check receiving pocket is in position to receive an operating check when the apparatus is at rest. This is not essential, however, and the apparatus may if desired be constructed so as to terminate each cycle of operations at any point between the time of completion of one change delivering operation and the time of commencing the next operation of the change delivering segments toward change delivering position. For example, if the chute 4 or 4' is provided with check selecting means, such as shown in our co-pending patent application aforesaid for check controlled apparatus, it will be apparent that a considerable period of time will be required for the check after being released by the contact member 18 to pass through such check selecting means and in such cases the limit switch may be so adjusted with respect to shaft 69 as to cause each cycle to be completed substantially upon completion of the movement of the delivering means to change delivering position. Under these conditions, the first operation of the change delivering mechanism upon insertion of a metal check in position to complete the circuit of the motor, will return the check holding pocket to position to discharge the coin therefrom, after which said check holding pocket will be moved to position to receive a check from the chute 4 or 4', the time required to effect these movements being sufficient to permit the check to pass through the check selecting means so that said check will be delivered through the end of chute 4 and 4' while the check holding pocket is in position to receive the same. It will be understood that the purpose of pin 121 and slot 120 in the first form of the invention and pin 245 and slot 246 in the second form of the invention is to provide in either case for a certain amount of movement of shaft 69 while the check holding pocket remains in check receiving position and thus permit a certain amount of variation in the time required for the check to reach said pocket after it is released by the contact means in chute 4 or 4'.

The above described change delivering apparatus may be used for a wide variety of purposes. For example, they may be placed at convenient points in stores, banks, railroad stations, or other public buildings, for the accommodation of customers or others desiring to obtain change for coins, for operation of pay telephones or other coin controlled devices, or for delivering change at railroad, subway, or elevated stations. In the latter case, if desired, a check or ticket may be delivered simultaneously with the change, by substantially the same mechanism as above described, a stack of ticket checks being placed, for example, in one of the change holding tubes instead of coins. Many other uses will become apparent, in all of which time will be saved for the public, and the machine will replace an attendant or ticket seller and thus pay for itself to the person installing the machine.

We claim:

1. A change delivering apparatus comprising a bearing member having a flat upper surface and provided with a plurality of openings extending vertically therethrough, a plurality of substantially vertical change holding tubes having their lower ends open and spaced above said bearing member by a distance at least equal to the thickness of the individual coins to be delivered and each adapted to hold a stack of coins, there being one of said openings in the bearing member corresponding to each of said change holding tubes and of corresponding size but out of alignment therewith, a plurality of adjoining change delivering segments independently and rotatably mounted above said bearing member and adapted to move beneath said change holding tubes, said segments being provided with recesses corresponding to the several change holding tubes and of corresponding size and being rotatable between a position in which the recesses therein are beneath the corresponding change holding tubes and a position in which said recesses are above the corresponding openings in the bearing member, and check controlled means for selectively causing rotation of certain of said segments between said positions to deliver different amounts of change.

2. An apparatus as set forth in claim 1, said means for selectively causing rotation comprising an operating member normally free from operative connection to said segments and provided with a plurality of check holding means, each adapted to receive and hold a check in position to key said operating member to one of said segments, means for delivering checks of different values to said check holding means, and means for rotating said operating member.

3. A change delivering apparatus comprising a series of change delivering segments lying in a common horizontal plane and mounted for rotation about a common center, an operating member extending around the outer edge of said segments and also mounted for rotation about said common center, means on said operating member engaging one of said segments to cause rotation of said segment with said operating member in one direction only, said operating member being normally free from operative engagement with said segments upon rotation in the other direction, a plurality of vertical change-holding tubes above said segments, each of said change holding tubes being open at its lower end and being adapted to hold a stack of coins, a member extending beneath said segments and provided with openings corresponding to the respective change holding tubes and of corresponding size but out of alignment therewith, said segments being provided with recesses corresponding to the respective change holding tubes and of corresponding size and said segments being rotatable independently of each other in said other direction from positions in which the several recesses therein are beneath the corresponding change holding tubes and positions in which said recesses are above the corresponding openings in the member beneath said segments, and means dependent upon insertion of a check at different positions on said operating member for causing such rotation in said other direction of certain ones of said segments.

4. A change delivering apparatus comprising change delivering means, an operating member for said change delivering means but normally free from operative connection therewith, check conducting means adapted to receive a metal check and to deliver the same in position to establish an operative connection between said operating member and said change delivering means, an electric motor operatively connected to said operating member, a control circuit for said motor, contact means in said check conducting means and included in said control circuit, said contact means defining a normally open break in said circuit which is adapted to be closed by a metal check passing through said check conducting means to said connection establishing position, and switch means for causing said motor to operate said operating member through one complete operation each time said normally open break is so closed, said check conducting means being adapted to deliver said check, subsequent to closing of the break in said circuit thereby, to said position to establish operative connection of the operating member with said change delivering means in time to cause said complete operation of the operating member to effect an operation of said change delivering means.

5. A change delivering apparatus comprising change delivering means having a check holding pocket, a chute adapted to receive a metal check and to deliver the same to said check holding pocket, said chute having a metal wall, an electric motor, a contact member normally projecting in said chute in position to be engaged by a check therein, an electric control circuit for said motor including a normally open break between said contact member and said metal wall of the chute so as to cause operation of said motor upon engagement of a metal check within said chute with said contact member, means operable by said motor, to remove said contact member from said chute, and means subsequently operable by said motor and dependent upon delivery of a check to said check holding pocket to cause operation of said change delivering means.

6. A change delivering apparatus comprising change delivering means having a check holding pocket, a metal walled chute adapted to receive a metal check and deliver the same to said check holding pocket, an electric motor, a contact member insulated from the walls of said chute and having an arm normally projecting into said chute, an electric control circuit for said motor including a normally open break between said contact member and the wall of said chute, whereby engagement of a check with said arm is adapted to complete said control circuit and cause operation of said selecting means, means operable by said motor for removing said arm from said chute, and means subsequently operable by said motor and dependent upon delivery of a check to said check holding pocket to cause operation of said check delivering means.

7. An apparatus as set forth in claim 6, said contact member comprising in addition another arm normally removed from said chute and movable into said chute above said first-named arm upon movement of said first-named arm out of said chute.

8. A change delivering apparatus comprising change delivering means having a check holding pocket, a chute adapted to receive a check and to deliver the same to said check holding pocket, said change delivering means being normally in position to receive the check so delivered, and means controlled by insertion of a check in said chute and operable, after an interval of time sufficient to permit said check to be delivered to said check holding pocket, to cause said change delivering means to operate to deliver change and to return to said normal position.

9. A change delivering apparatus comprising a series of adjoining change delivering segments lying in a common horizontal plane and mounted for rotation about a common axis, whereby rotation of any segment will also cause rotation of each segment lying ahead of it in the direction of rotation, a plurality of change-holding tubes above said segments open at their lower ends and each adapted to hold a stack of coins, a bearing member extending beneath said segments and provided with openings corresponding to the respective change-holding tubes and of corresponding size but out of alignment therewith, said segments being provided with openings therethrough corresponding to the respective change-holding tubes and of corresponding size and being rotatable independently in one direction from positions in which the respective openings therein are beneath the corresponding change-holding tubes to positions in which said openings are above the corresponding openings in said bearing member, an operating member mounted for rotation about said common axis and normally inoperative to effect rotation of any of said segments in said direction, each of said segments having a check receiving notch, said operating member having a plurality of check holding pockets each adapted to receive and hold a check in position of engagement with the check receiving notch in one of said segments and thereby key said operating member to said segment, means for delivering checks of different values to said check holding pockets, and means for rotating said operating member.

In testimony whereof we have hereunto subscribed our names this 13th day of February, 1928.

HUGH E. WURZBACH.
LESLIE H. WADSWORTH.